US009518815B2

(12) United States Patent
Velasquez et al.

(10) Patent No.: US 9,518,815 B2
(45) Date of Patent: Dec. 13, 2016

(54) ROTARY POSITION ENCODER FOR ROTATABLE SHAFTS

(75) Inventors: Thomas R. Velasquez, Camarillo, CA (US); David E. Wolf, Sunland, CA (US); Cody J. Carothers, Oxnard, CA (US); Brian J. Thoma, Tualatin, OR (US)

(73) Assignee: HAAS AUTOMATION, INC., Oxnard, CA (US)

( * ) Notice: Subject to any disclaimer, the term of this patent is extended or adjusted under 35 U.S.C. 154(b) by 941 days.

(21) Appl. No.: 12/537,170

(22) Filed: Aug. 6, 2009

(65) Prior Publication Data

US 2010/0033170 A1  Feb. 11, 2010

Related U.S. Application Data

(60) Provisional application No. 61/086,770, filed on Aug. 6, 2008.

(51) Int. Cl.
*G01B 7/30* (2006.01)
*G01D 5/347* (2006.01)
*G01D 11/24* (2006.01)

(52) U.S. Cl.
CPC ............... *G01B 7/30* (2013.01); *G01D 5/3473* (2013.01); *G01D 11/245* (2013.01)

(58) Field of Classification Search
CPC .......... H01L 43/08; H01L 43/00; H01L 43/06; G01R 33/0094; G01R 15/20; G01R 15/202; G01R 15/205; G01D 7/305; G01D 11/245; G01D 5/3473; G01D 5/2225; G01D 5/2233; G01D 5/2241; G01D 5/225; G01D 5/2258; G01D 5/2266; G01D 5/2275; G01D 5/2283; G01D 5/16; G01D 5/20; G01D 5/2006; G01D 5/2013; G01D 5/202; G01D 5/2026; G01D 5/2033; G01D 5/204; G01D 5/2046; G01D 5/2053; G01D 5/206; G01D 5/22; G01D 5/2208; G01D 5/2216; G01D 5/14; G01D 5/142; G01D 5/145; G01D 5/147; G01B 7/305; G01B 7/31; G01B 7/312; G01B 7/30; G01B 7/02; G01B 7/023; G01B 7/04; G01B 7/046; G01B 7/14

(Continued)

(56) References Cited

U.S. PATENT DOCUMENTS 5,597,242 A * 1/1997 Beeler .......................... 384/517
5,657,544 A * 8/1997 Ota et al. ..................... 33/1 N (Continued)

OTHER PUBLICATIONS

Definition of the term "on", obtained from Merriam-Webster, http://www.merriam-webster.com/dictionary/on?show=0&t=1407952085, obtained on Aug. 13, 2014, 7 pages.*

(Continued)

*Primary Examiner* — David M. Schindler
(74) *Attorney, Agent, or Firm* — McDermott Will & Emery LLP (57) ABSTRACT

A rotary position encoder is described that includes a hub configured to mount on an end of a rotatable shaft of a machine tool and rotate concurrently with the rotatable shaft. The hub includes a cup formed in a first end to receive the rotatable shaft, the cup having equally spaced axial grooves formed on an inner surface. A collar clamps the hub to the rotatable shaft by collapsing the cup around the rotatable shaft. The rotary position encoder further includes a sensor configured to detect a rotational position of the hub and a housing, wherein the sensor is mounted to the housing in a position opposite a second end of the hub. The hub is rotatably coupled to the housing via a bearing and a bracket (Continued)

is attached to the housing for mounting the rotary position encoder to the machine tool and preloading the bearing.

16 Claims, 6 Drawing Sheets

(58) Field of Classification Search
USPC .................................................. 324/207.25
See application file for complete search history.

(56) References Cited

U.S. PATENT DOCUMENTS

| | | | |
|---|---|---|---|
| 6,313,624 B1 * | 11/2001 | Alhorn et al. ............ | 324/207.17 |
| 6,396,259 B1 * | 5/2002 | Washeleski et al. .... | 324/207.22 |
| 7,058,537 B2 | 6/2006 | Sutter et al. | |
| 7,072,249 B2 | 7/2006 | Huang | |
| 7,089,573 B2 | 8/2006 | Hagiwara | |
| 7,089,835 B2 | 8/2006 | Bryan | |
| 7,093,540 B2 | 8/2006 | Giancaterino et al. | |
| 7,106,053 B2 | 9/2006 | Desbiolles | |
| 7,106,431 B2 | 9/2006 | Odell | |
| 7,110,022 B2 | 9/2006 | Aoyama | |
| 7,114,380 B2 | 10/2006 | Fehrenbach et al. | |
| 7,129,657 B2 | 10/2006 | Cavarec et al. | |
| 7,138,777 B2 | 11/2006 | Won et al. | |
| 7,141,907 B2 | 11/2006 | Yang et al. | |
| 7,154,699 B2 | 12/2006 | Subrahamanyan et al. | |
| 7,156,210 B2 | 1/2007 | Reynolds et al. | |
| 7,161,314 B2 | 1/2007 | Nakai et al. | |
| 7,172,667 B2 | 2/2007 | Vergona | |
| 7,176,449 B2 | 2/2007 | Shahbazi et al. | |
| 7,187,305 B2 | 3/2007 | Ellis et al. | |
| 7,193,347 B2 | 3/2007 | Tenca et al. | |
| 7,196,527 B2 | 3/2007 | Stridsberg | |
| 7,205,530 B2 | 4/2007 | Jones | |
| 7,207,723 B2 | 4/2007 | Nakajima et al. | |
| 7,208,940 B2 | 4/2007 | Withanawasam et al. | |
| 7,208,944 B2 | 4/2007 | Tatschl et al. | |
| 7,215,112 B1 | 5/2007 | Recio et al. | |
| 7,222,543 B2 | 5/2007 | Rhodes et al. | |
| 7,233,139 B2 | 6/2007 | Kitanaka et al. | |
| 7,245,103 B2 | 7/2007 | Chapman et al. | |
| 7,249,891 B2 | 7/2007 | Aoki et al. | |
| 7,250,701 B2 | 7/2007 | Yoshiyama et al. | |
| 7,253,580 B2 | 8/2007 | Stockberger et al. | |
| 7,263,905 B2 | 9/2007 | Seffernick et al. | |
| 7,267,486 B2 | 9/2007 | Ohtsuki et al. | |
| 7,275,557 B2 | 10/2007 | Piciotti et al. | |
| 7,281,851 B2 | 10/2007 | Horiuchi et al. | |
| 7,292,741 B2 | 11/2007 | Ishiyama et al. | |
| 7,298,395 B2 | 11/2007 | Fukaya et al. | |
| 7,298,500 B2 | 11/2007 | Sato et al. | |
| 7,298,967 B2 | 11/2007 | Chen et al. | |
| 7,307,414 B2 | 12/2007 | Ito | |
| 7,307,415 B2 | 12/2007 | Seger et al. | |
| 7,309,307 B2 | 12/2007 | Baenninger et al. | |
| 7,710,108 B2 * | 5/2010 | Keller et al. ............... | 324/207.2 |
| 2003/0080732 A1 * | 5/2003 | Okazaki et al. ........... | 324/207.2 |
| 2004/0174159 A1 * | 9/2004 | Ramirez .................. | 324/207.13 |
| 2008/0164866 A1 * | 7/2008 | Steinich et al. ........... | 324/207.2 |
| 2008/0218158 A1 * | 9/2008 | Carlson et al. ............ | 324/207.2 |
| 2009/0047162 A1 * | 2/2009 | Uchikado et al. .............. | 418/69 |

OTHER PUBLICATIONS

Definition for the term "end", obtained from Dictionary.com, http://dictionary.reference.com/browse/end?s=t, obtained on Aug. 13, 2014, 4 pages.*

Definition of tab, Dictionary.com (http://dictionary.reference.com/browse/tab?s=t), obtained on Jan. 10, 2016.*

* cited by examiner

ROTARY POSITION ENCODER FOR ROTATABLE SHAFTS

This application claims the benefit of U.S. Provisional Application No. 61/086,770, filed Aug. 6, 2008, which is hereby incorporated by reference herein for all purposes.

FIELD

The invention relates to machine tools and, in particular, concerns a rotary position encoder for detecting the rotational position of a rotatable shaft of a machine tool.

BACKGROUND

Computer numerical controlled (CNC) machine tools allow machinists to repeat a machining process on multiple work pieces with high accuracy. A controller operates the machine tool and positions the work piece in accordance with a sequence of programmed instructions. The accuracy of the machining process, and correspondingly the quality of the finished work piece, relies on the controller having accurate data on the positions of the components of the machine tool and the work piece during the machining process.

Rotary position encoders are used in CNC machine tools to detect the rotational position of a rotatable shaft, such as the shaft of an electric motor. The environment in which CNC machine tools typically operate presents several challenges to conventional rotary position encoders. For example, waste material removed from the work piece and lubricant used during the machining process may contaminate and cause premature failure of the detector used to determine the rotational position of the shaft or the mechanism used to connect the encoder to the shaft. Additionally, the mechanical designs of conventional rotary position encoders are either susceptible to failure due to the vibrations and other forces experienced by the encoder during machining processes or are overly expensive and complex.

SUMMARY

The invention addresses the foregoing concerns by providing a reliable, mechanically robust rotary position encoder. The novel rotary position encoder is configured to be mounted directly on a rotatable shaft using a single-bearing design. A bracket secures the rotary position encoder to anchor points on a machine tool and preloads the bearing to facilitate uniform rotation as the shaft rotates. The rotary position encoder mounts directly to the shaft so that its centerline is concentric with the shaft. This configuration simplifies the alignment of the rotary position encoder with the shaft and helps to maintain that alignment during operation of the machine tool. When implemented with a resilient sensor, such as a magnetic encoder, the novel rotary position encoder provides a reliable and robust solution unavailable from conventional designs currently used in the art.

According to one embodiment, a rotary position encoder is provided that includes a hub configured to mount on an end of a rotatable shaft of a machine tool. The rotary position encoder further includes a sensor configured to detect a rotational position of the hub and a housing, wherein the sensor is mounted to the housing in a position opposite a second end of the hub. The hub is rotatably coupled to the housing via a bearing and a bracket is attached to the housing for mounting the rotary position encoder to the machine tool and preloading the bearing.

The foregoing summary of the invention has been provided so that the nature of the invention can be understood quickly. A more detailed and complete understanding of the preferred embodiments of the invention can be obtained by reference to the following description of the invention together with the associated drawings.

DETAILED DESCRIPTION

The detailed description set forth below in connection with the associated drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without all of the specific details contained herein. In some instances, well known structures and components are described in general and may be shown in block diagram form in order to avoid obscuring the concepts of the invention.

Figure 1:
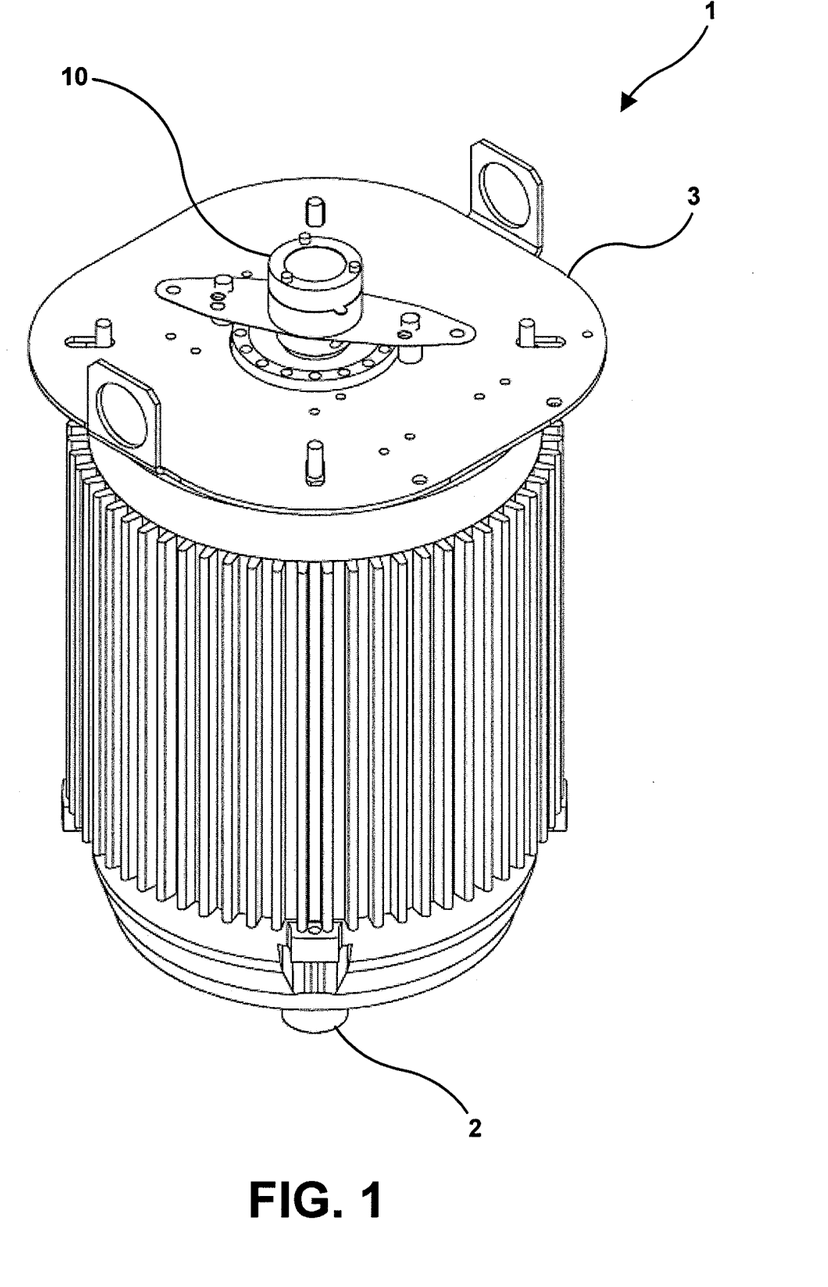
FIG. 1 is a perspective drawing of an electric motor and a rotary position encoder according to one embodiment.

FIG. 1 is a perspective drawing of an electric motor 1 suitable for use in a machine tool or any other application requiring a rotatable shaft. Electric motor 1 includes a shaft 2 that extends through electric motor 1 and is rotatable around an axis that extends along the center of shaft 2. The rotation of shaft 2 may be controlled by supplying different amounts of power to electric motor 1. For example, a CNC machine tool controller (not shown) may vary the amount of power supplied to electric motor 1 to control the speed and duration of rotation of shaft 2. In addition, the direction in which shaft 2 rotates may be controlled by changing the polarity of the power supplied to electric motor 1. Electric motor 1 also includes bracket 3, which is rotationally independent of shaft 2 and therefore does not rotate with shaft 2. Bracket 3 provides one or more surfaces for mounting electric motor 1 in a stable position while allowing the independent rotation of shaft 2. The operation of electric motors is well known in the art and will not be described further herein. Furthermore, those skilled in the art will recognize that the scope of the invention is not limited to any particular type or configuration of electric motor and includes other devices having a rotatable shaft.

FIG. 1 also depicts rotary position encoder 10 mounted to electric motor 1. As will be described in more detail, rotary position encoder 10 detects the rotational position of shaft 2 and communicates data containing information on the rotational position of shaft 2 to a controller (not shown). The controller may then use this positional data to monitor and control the rotation of shaft 2. Exemplary components of rotary position encoder 10 and the operation thereof will now be described.

Figure 2:
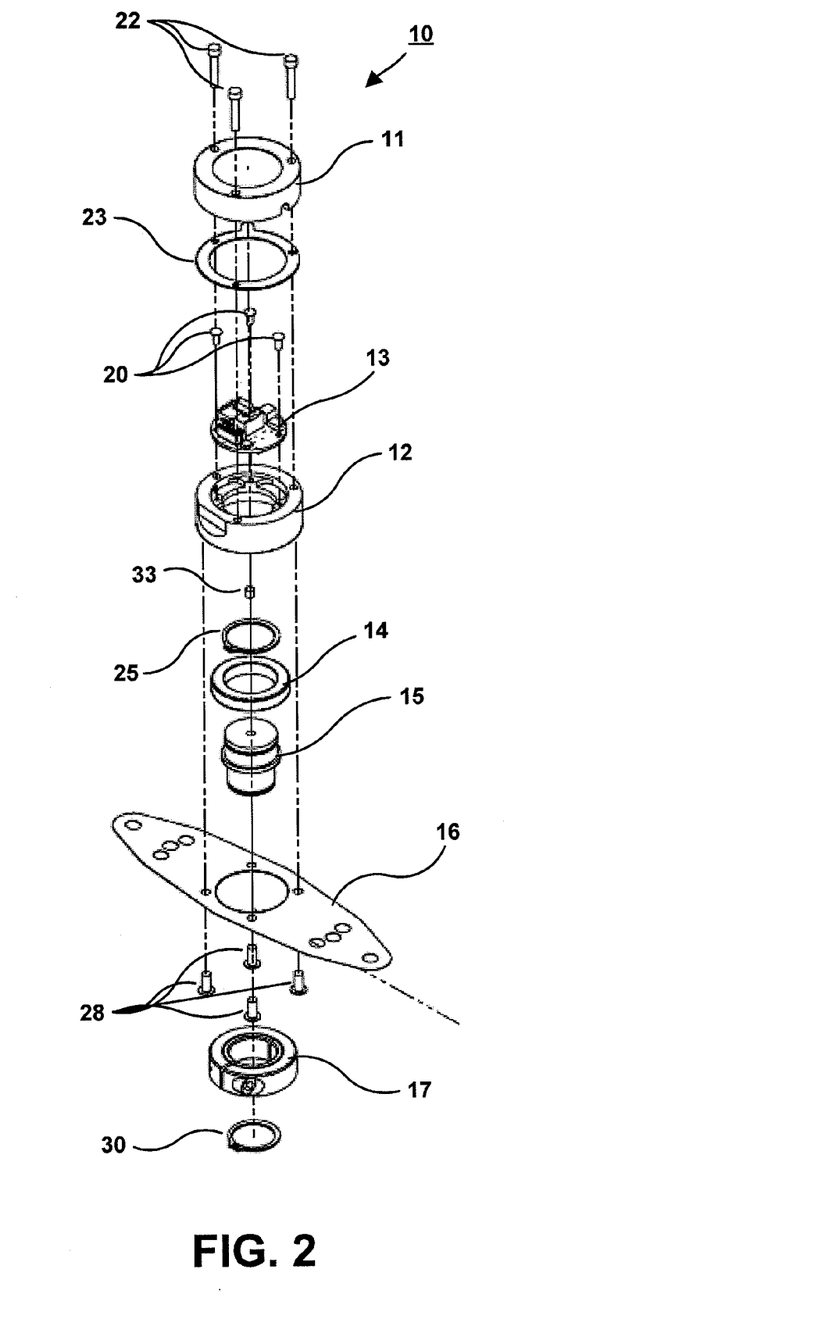
FIG. 2 is an exploded view of a rotary position encoder according to one embodiment.

FIG. 2 is an exploded view of rotary position encoder 10 according to one embodiment. As depicted in FIG. 2, rotary position encoder 10 includes cap 11 and body 12, which together form a sensor housing in which sensor 13 is mounted. Rotary position encoder 10 further includes bearing 14 which rotatably couples hub 15 to body 12. Bracket 16 is attached to body 12 and is used to mount rotary position encoder 10 to anchor points on a machine tool (e.g., anchor points on bracket 3 of electric motor 1). Collar 17 is used to clamp the end of a rotatable shaft, such as shaft 2 of electric motor 1, to hub 15. A more detailed explanation of the components of rotary position encoder 10 is provided below.

Figure 3A:
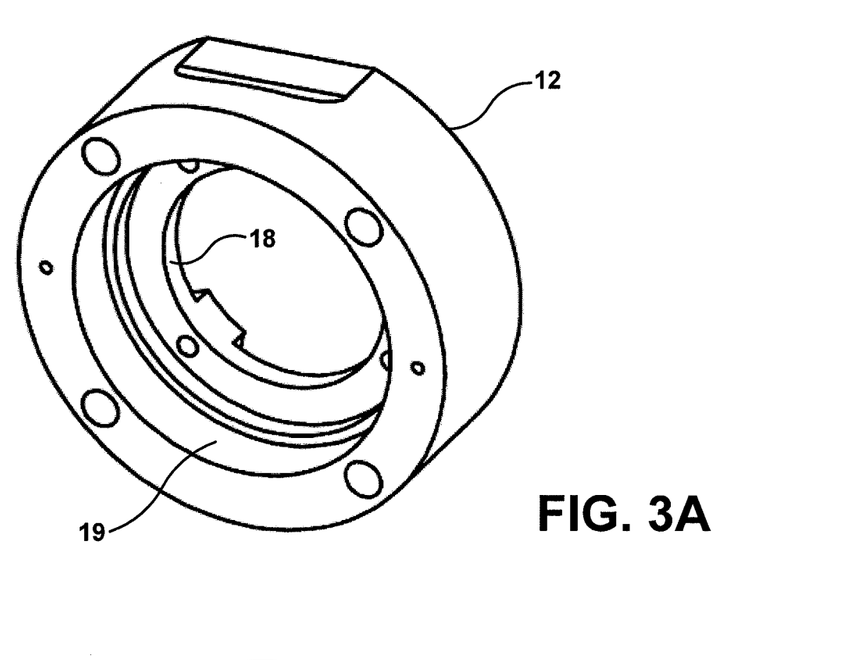
FIGS. 3A and 3B are opposing perspective drawings of the body of a rotary position encoder according to one embodiment.
Figure 3B:
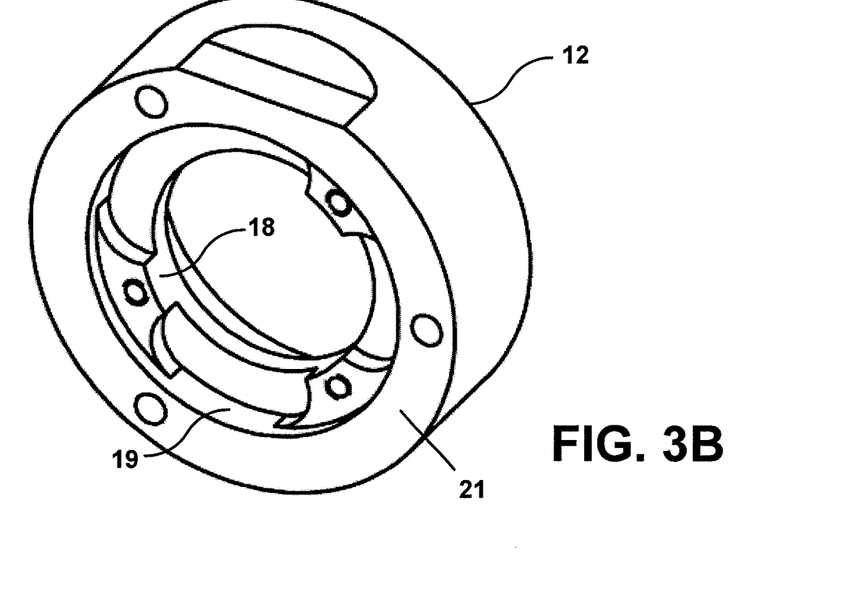

Body 12 provides a structure for mounting and positioning sensor 13 in rotary position encoder 10. FIGS. 3A and 3B are opposing perspective drawings of body 12 according to one embodiment. As depicted in FIGS. 3A and 3B, body 12 is a ring-shaped structure having a ridge 18 extending from an inner surface 19 of body 12. Sensor 13 is positioned within the inner diameter of body 12 and mounted to ridge 18. In this manner, sensor 13 is held in a central position within rotary position encoder 10 that is partially protected by body 12.

As shown in FIG. 2, sensor 13 is mounted to ridge 18 with screws 20. It is noted, however, that sensor 13 may be mounted to ridge 18 using other means. For example, rivets may be used in place of screws 20 or, alternatively, an adhesive may be used to mount sensor 13 to ridge 18. In other alternative embodiments, sensor 13 may have a diameter larger than the inner diameter of body 12 and be mounted to a surface 21 at a first end of body 12 using any of a number of securing means such as screws, rivets, adhesive, etc. In these alternative embodiments, body 12 may not include ridge 18. Those skilled in the art will recognize that using securing means such as screws 20 allows sensor 13 to be detachably mounted to body 12 thereby facilitating the removal of sensor 13 from body 12 for repair or replacement.

Returning to FIG. 2, cap 11 is attached to the first end of body 12 thereby partially defining a cavity containing sensor 13. As shown in FIG. 2, cap 11 is attached to the first end of body 12 using screws 22 with an optional gasket 23 positioned between the mating surfaces of cap 11 and body 12. Gasket 23 provides a seal between cap 11 and body 12 to help prevent contaminants, such as waste material and lubricants, from entering the cavity containing sensor 13 and damaging sensor 13. Gasket 23 may be formed from any of a number of gasket materials known to those skilled in the art.

Cap 11 may be attached to body 12 using other means besides screws 22. For example, rivets or other known fastening devices may replace screws 22. Alternatively, cap 11 may be attached to body 12 using adhesives or by welding. In other alternative embodiments, cap 11 and body 12 may be formed with corresponding threaded structures allowing them to be connected together without separate fastening devices such as screws 22. Using these threaded structures or fastening means such as screws 22 allows cap 11 to be detachable from body 12 thereby facilitating access to sensor 13 for repair or replacement.

For purposes of this description, cap 11 and body 12 are together referred to as a sensor housing, or simply a housing, for sensor 13. For applications in which contamination of sensor 13 is not a concern, cap 11 may not be included in rotary position encoder 10 leaving sensor 13 exposed. In these applications, body 12 would comprise the housing for sensor 13.

Figure 4A:
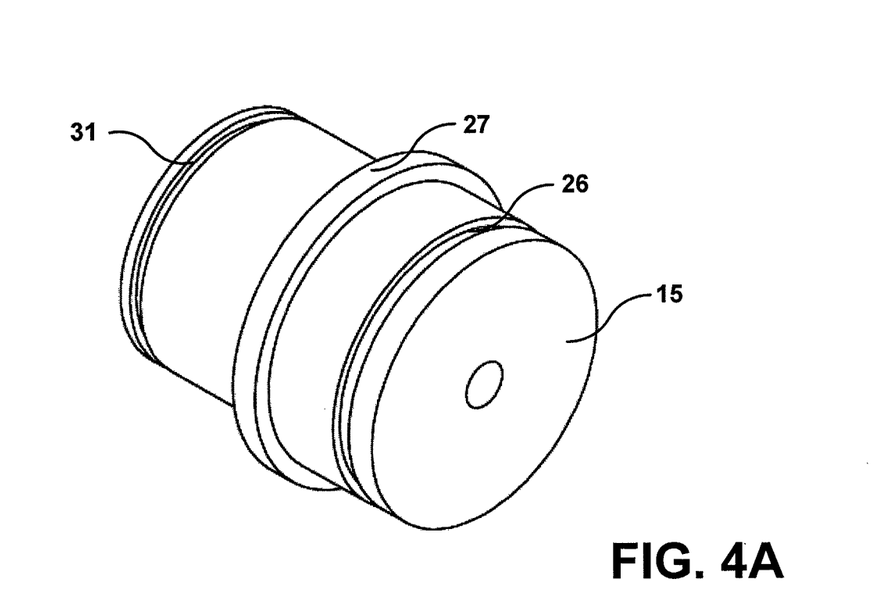
FIGS. 4A and 4B are opposing perspective drawings of the hub of a rotary position encoder according to one embodiment.
Figure 4B:
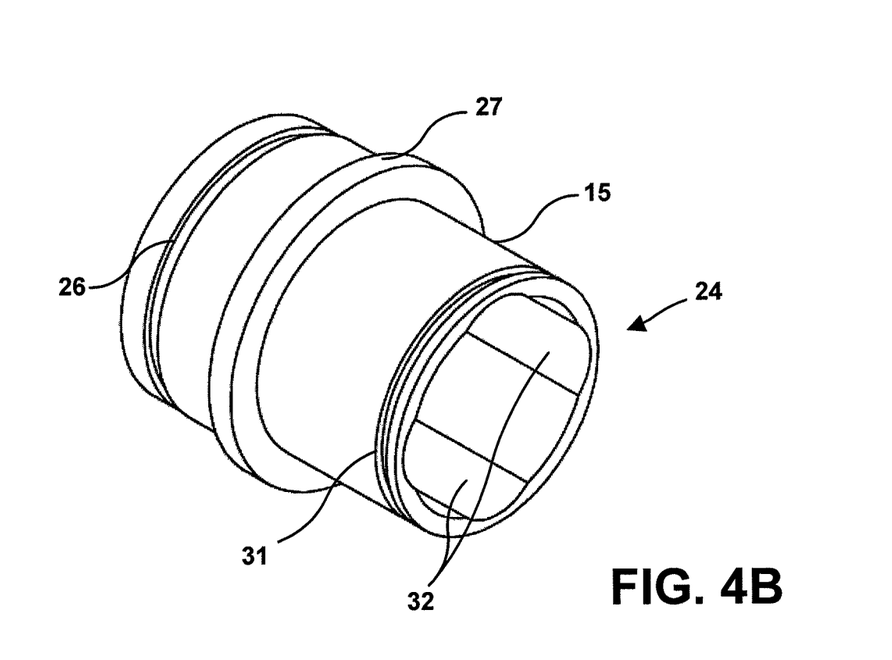

FIGS. 4A and 4B are opposing perspective drawings of hub 15 according to one embodiment. Hub 15 is generally cylindrical in shape having a mounting cup formed in a first end 24. The mounting cup defines a cavity configured to receive the end of a rotatable shaft, such as shaft 2 of electric motor 1. The cross-sectional shape of the mounting cup is designed to mate to the cross-sectional shape of the rotatable shaft to which hub 15 will be attached. The clearance range between the outer diameter of the rotatable shaft and the inner diameter in the mounting cup of hub 15 is relatively small, for example, between 0.0002 and 0.0017 inches. Generally, the rotatable shaft is cylindrical having a circular cross-sectional shape. Alternatively, the rotatable shaft, or an end portion thereof, may have one or more flattened sides thereby creating a different cross-sectional shape such as a square, triangle, etc. The depth of the mounting cup along an axial length of hub 15 and the thickness of the wall of the mounting cup is dependent upon the anticipated stresses the rotatable shaft will place on hub 15 and the strength properties of the material used to form hub 15. Those skilled in the art will recognize appropriate design parameters to take these stresses into account.

Figure 5:
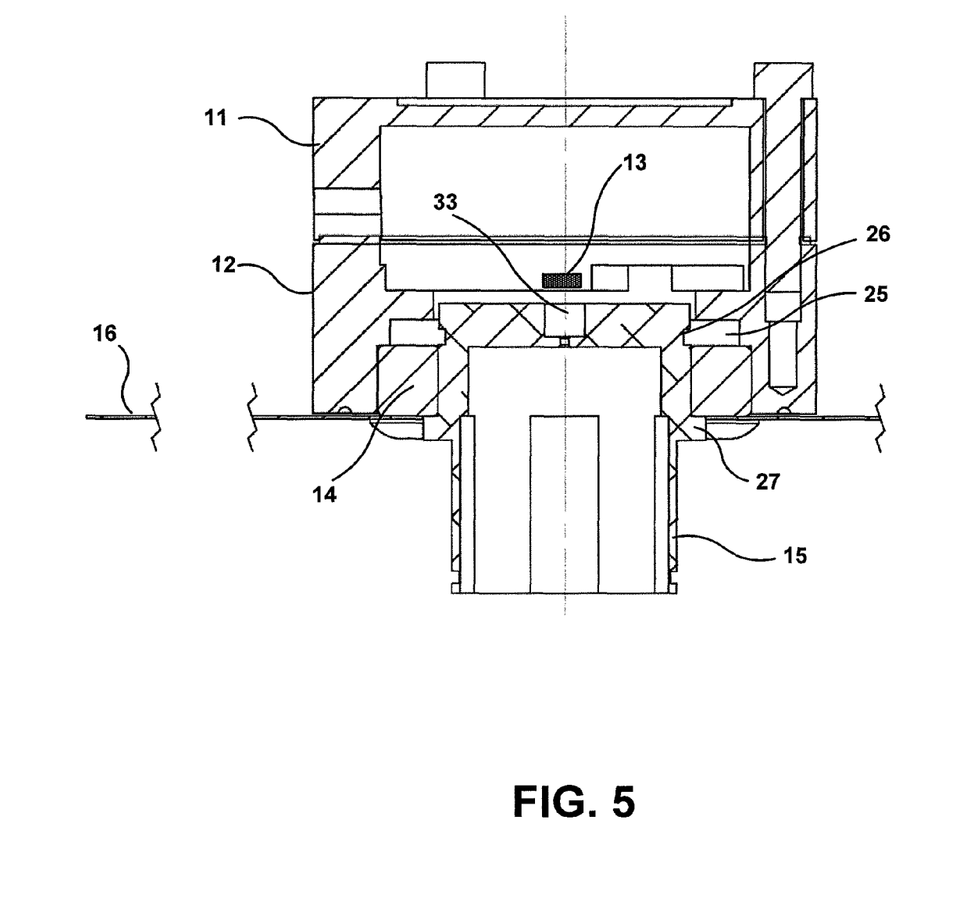
FIG. 5 is a cross-sectional view of a rotary position encoder according to one embodiment.

Hub 15 is rotatably coupled to body 12 via bearing 14. An arrangement of these components according to one embodiment is depicted in the cross-sectional view shown in FIG. 5. As depicted in FIG. 5, an annular portion of the outer surface of hub 15 is in contact with an inner surface of bearing 14 (e.g., inner race) and an annular portion of the inner surface of body 12 is in contact with an outer surface of bearing 14 (e.g., outer race). With this configuration, hub 15 is rotatable with respect to body 12 around a common centerline axis.

Generally, the radial load on bearing 14 will be greater than the thrust or axial load. Accordingly, bearing 14 is typically implemented with a radial rolling element bearing, such as a deep groove ball bearing. The required load ratings of bearing 14 may vary depending on the expected loads placed on bearing 14. For example, commercial machine tools may require a radial load rating of 600 to 950 lbs. and an axial load rating of 300 to 475 lbs. Those skilled in the art will recognize how to select a bearing having proper load ratings for a given application.

Hub 15 may be pressed into bearing 14, thereby relying on friction to maintain the contact between the inner surface of bearing 14 and the outer surface of hub 15. Similarly, bearing 14 may be pressed into body 12, thereby relying on friction to maintain the contact between the inner surface of body 12 and the outer surface of bearing 14. In alternative embodiments, one or both of these fittings may be secured using an adhesive or welding the respective components together. According to one embodiment, a retaining ring 25 is positioned inside a groove 26 formed on the outer surface of hub 15 to secure bearing 14 against a ridge 27 extending from the outer surface of hub 15. As shown in FIG. 5, bearing 14 and hub 15 further define the cavity containing sensor 13 when mounted in body 12 and thereby help prevent contamination of sensor 13 by waste materials and lubricants.

Bracket 16 is attached to an end body 12 opposite the end of body 12 attached to cap 11. Hub 15 extends away from body 12 through a central opening defined in bracket 16. Bracket 16 is configured to mount rotary position encoder 10 to anchor points on a machine tool, such as on bracket 3 of electric motor 1. As shown in FIG. 2, bracket 16 includes two mounting tabs that extend away from body 12 in two directions. Each mounting tab of bracket 16 provides a mounting point for attaching rotary position encoder 10 to an anchor point on the machine tool using one more holes formed in the mounting tabs of bracket 16. It is noted, that the shape of bracket 16 is not limited to that depicted in FIG. 2. In alternative embodiments, bracket 16 may include more than two mounting tabs extending away from body 12. For example, bracket 16 may include three or four mounting tabs to provide more than two mounting points for rotary position encoder 10. In addition, the directions in which the mounting tabs of bracket 16 extend away from body 12 may not be equally spaced around the perimeter of body 12.

As shown in FIG. 2, bracket 16 is attached to body 12 using screws 28. In alternative embodiments, other fastening means such as rivets may be used to secure bracket 16 to body 12. In yet other alternative embodiments, bracket 16 may be secured to body 12 using an adhesive or by welding.

Figure 6:
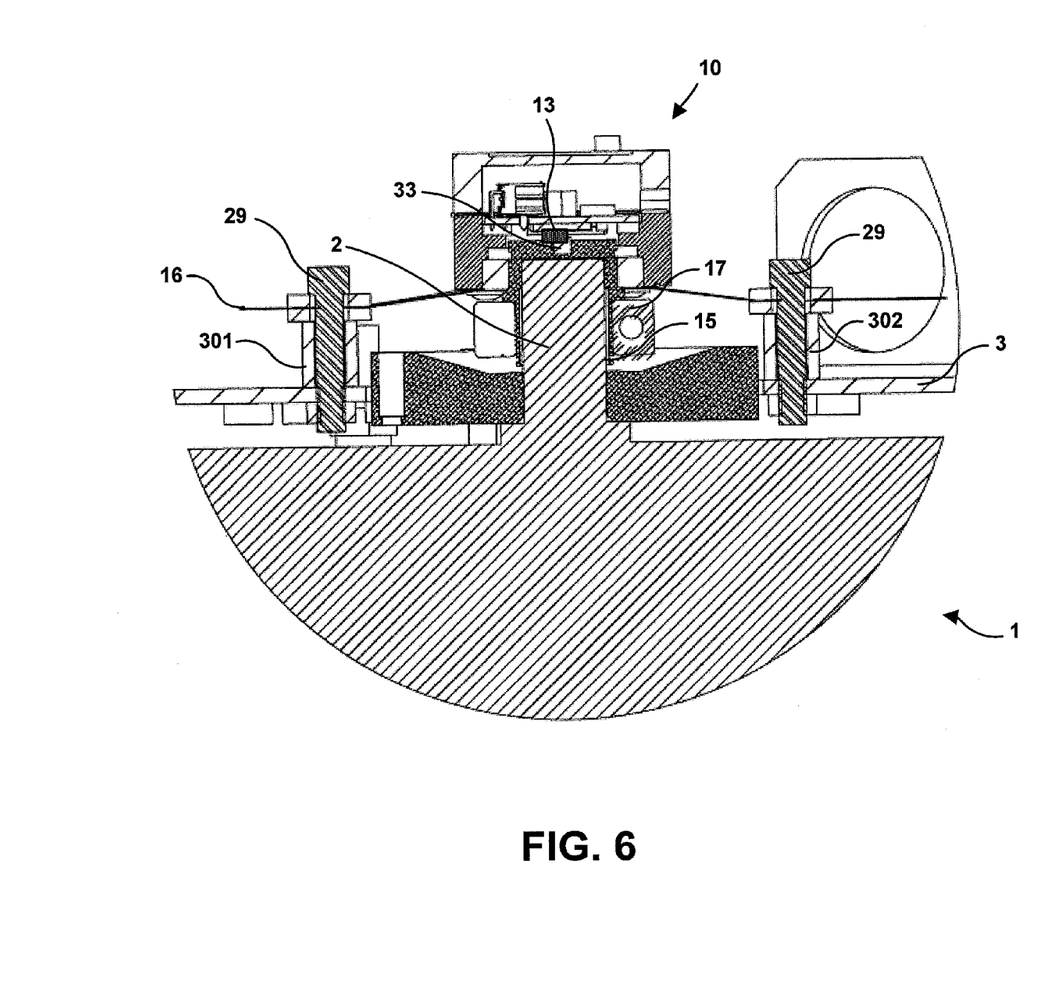
FIG. 6 is a cross-sectional view of a rotary position encoder mounted on an electric motor according to one embodiment.

FIG. 6 is a cross-sectional view of rotary position encoder 10 mounted to electric motor 1 according to one embodiment. The internal details of electric motor 1 have been omitted from FIG. 6 so as not to obscure the features of rotary position encoder 10. As depicted in FIG. 6, bracket 16 is mounted to anchor points 301 and 302 on bracket 3 of electric motor 1. According to one embodiment, screws 29 pass through holes defined in the mounting tabs of bracket 16 and secure rotary position encoder 10 to anchor points 301 and 302 on bracket 3. In alternative embodiments, other fastening means may be used to attach bracket 16 to bracket 3. For example, other types of fasteners such as rivets may replace screws 29 or bracket 16 may be attached to anchor points 301 and 302 on bracket 3 using an adhesive or by welding.

In the configuration depicted in FIG. 6, hub 15 is attached to shaft 2 of electric motor 1. More particularly, an end of shaft 2 is inserted into the mounting cup of hub 15 and is secured in place with collar 17. Collar 17 is configured to apply pressure around the outer surface of hub 15 in order to collapse the mounting cup of hub 15 around the end of shaft 2. In this manner, hub 15 is secured to shaft 2 so that hub 15 rotates with shaft 2 with substantially no slippage between hub 15 and shaft 2.

Collar 17 is configured to apply pressure on the outer surface of hub 15 in a manner that keeps shaft 2 centered within hub 15 as the mounting cup collapses around the end of shaft 2. According to one embodiment, collar 17 is a clamp collar such as the one depicted in FIG. 2. Alternatively, collar 17 may be a pinch collar or other types of securing mechanisms known to those of skill in the art that allows shaft 2 to remain centered within hub 15 when secured in the mounting cup. In alternative embodiments, shaft 2 may be pressed into the mounting cup of hub 15 and rely on friction to secure the two components together, or an adhesive or welding may be used to secure shaft 2 within the mounting cup. Those of skill in the art will recognize other alternative securing means may be used so long as shaft 2 is centered within the mounting cup of hub 15.

FIG. 2 depicts a retaining ring 30 used to secure collar 17 on the end of hub 15. Retaining ring 30 may be positioned in groove 31 formed on the outer surface hub 15, as shown in FIGS. 4A and 4B, thereby preventing collar 17 from sliding off hub 15 prior to rotary position encoder 10 being mounted. Retaining ring 30 is an optional component of rotary position encoder 10 and may be removed after or just prior to rotary position encoder 10 being mounted as shown in FIG. 6, for example.

Returning to FIG. 4B, the mounting cup of hub 15 is depicted with a number of grooves 32 formed on the inner surface of hub 15. Grooves 32 extend in an axial direction along the inner surface of the mounting cup of hub 15. Grooves 32 are equally spaced around the perimeter of the inner surface of the mounting cup of hub 15. Grooves 32 are formed to thin portions of the wall of the mounting cup of hub 15, for example, by approximately 50%. The amount of reduction or relief may vary from 50%, but less than 100%, depending on the material used to form hub 15 and the anticipated stress exerted on hub 15 by the rotatable shaft. Grooves 32 facilitate the uniform collapse of the mounting cup around a rotatable shaft, such as shaft 2, when collar 17 is tightened. In this manner, the rotatable shaft remains centered in the mounting cup such that its axis of rotation is coaxial with the axis of rotation of hub 15 and the centerline of rotary position encoder 10. Grooves 32 may be formed using any of a number of techniques known to those skilled in the art, such as radii cuts, and may have a cross-sectional shape different from the rounded shape shown n FIG. 4B. FIG. 4B depicts four grooves 32. However, the scope of the invention includes configurations having more or less than four grooves 32.

As shown in FIG. 6, bracket 16 mounts to the top surfaces of anchor points 301 and 302. Rotary position encoder 10 is configured such that when hub 15 is mounted to shaft 2 an offset exists between the lower face of bracket 16 and the adjacent top surfaces of anchor points 301 and 302. Bracket 16 is fabricated from a flexible material and when it is secured to anchor points 301 and 301 using screws 29, the mounting tabs of bracket 16 flex toward the top surfaces of anchor points 301 and 302 until they contact those top surfaces. In this manner, bracket 16 acts as a spring against shaft 2 and hub 15 that preloads bearing 14 with a thrust or axial load. This preloading of bearing 14 facilitates the uniform rotation of the roller elements inside the races of bearing 14 over the life of rotary position encoder 10. The flexibility of bracket 16 also provides a limited freedom of movement to rotary position encoder 10.

According to one embodiment, bracket 16 is fabricated using stainless steel, such as a 300 or 400 series stainless steel having a thickness in the range of 0.012 to 0.015 inches. With an offset of between 0.090 and 0.100 inches between the mounting tabs of bracket 16 and the top surfaces of anchor points 301 and 302, bracket 16 preloads bearing 14 with a load between 2 and 6 lbs. Those skilled in the art will recognize other materials that may be used to fabricate bracket 16 and respective thicknesses that will provide sufficient preloading for different implementations. For example, different types of bearings may require preloading with different amounts of load for proper functioning of the bearing. Different loads may be achieved by using different materials and/or different thicknesses for bracket 16, as is understood by those skilled in the art.

As noted above, sensor 13 is mounted in a central position within body 12 of rotary position encoder 10. In this configuration, sensor 13 is positioned adjacent an end of hub 15 opposite the mounting cup. Sensor 13 is configured to detect the rotational position of hub 15, which rotates concurrently with shaft 2 when mounted to electric motor 1. In this manner, sensor 13 also detects the rotational position of shaft 2. Also noted above, rotary position encoder 10 is configured to keep shaft 2 centered within the mounting cup of hub 15. When centered, the centerline of rotary position encoder 10 is concentric with shaft 2 such that shaft 2 and hub 15 are rotatable around a common axis (i.e., coaxial). Sensor 13 is mounted within body 12 to be aligned with this common axis of hub 15 and shaft 2. Because the relative positions of sensor 13 and hub 15 are fixed at the time of assembly of rotary position encoder 10, mounting rotary position encoder 10 and aligning sensor 13 with shaft 2 are simplified compared to conventional designs that may require independent alignment of a sensor after the encoder has been mounted.

Sensor 13 includes a sensing element, which remains in a fixed position with respect to body 12, for detecting the position of an active element, which rotates with hub 15. According to one embodiment, sensor 13 comprises an angular magnetic encoder chip that uses a sensor array to detect the magnetic flux of a diametrically polarized magnet. As the magnet changes positions, the output pulses of the sensor array vary and allow the encoder chip to detect the angular position of the magnet by monitoring the output pulses. According to one embodiment, sensor 13 comprises the AM8192B angular magnetic encoder IC produced by Rotary and Linear Motion Sensors (RLS).

The active element used in conjunction with the RLS encoder IC is a diametrically polarized cylindrical magnet 33. As depicted in FIGS. 2, 5 and 6, magnet 33 is mounted in a cavity formed in the end of hub 15 adjacent sensor 13. The distance separating magnet 33 and sensor 13 will vary depending on the particular sensing element and type of magnet used. Suitable distances will be apparent to those skilled in the art. Magnet 33 is centered on the axis of rotation of hub 15 and shaft 2 and therefore rotates concentrically with them. In alternative embodiments, magnet 33 may be adhered to the surface of the end of hub 15 rather than being embedded in a cavity formed therein. Using the RLS encoder IC, sensor 13 is able to encode up to 8192 counts per revolution of magnet 33. A controller interprets the counts to determine the rotational position of hub 15 (and shaft 2) with a resolution of 0.0439°, and to determine a rotational speed of hub 15 (and shaft 2) based on the rate of the counts. Such a controller may be a component of sensor 13 or may be external to sensor 13, such as part of a machine tool controller. Sensor 13 also may include circuitry for conditioning the output signals of the sensing element for communication with an external controller.

Those skilled in the art will recognize that the scope of the invention is not limited to the RLS encoder IC and magnet 33. Other types of sensing elements and active elements may be used to detect the rotational position of hub 15. It is noted, however, that using a magnetic encoder solution provides a more durable solution than that afforded by optical or mechanical sensing mechanisms.

Sensor 13 also may comprise components for supplying power to the sensing element, either by battery or by a wired connection to an external power source, as well as components for communicating and/or recording the rotational position data captured by the sensing element. In this regard, rotary position encoder 10 includes an interface for communicating the rotational position data captured by the sensing element. The interface may comprise a physical interface for coupling a cable to sensor 13 and for facilitating the communication of data and control signals between an external controller and sensor 13. The cable may include conductive elements, such as one or more copper wires, or optical elements, such as one or more optical fibers. Such a cable may penetrate the sensor housing of rotary position encoder 10 through the notch formed in the side of cap 11, such as depicted in FIG. 2. The cable also may supply power to sensor 13. Alternatively, the interface may facilitate the wireless communication of the rotational position data captured by the sensing element. The wireless interface may use any of a number of known protocols for wireless communications known to those skilled in the art.

Cap 11, body 12 and hub 15 may be made from any of a number of known materials, such as different types of metal and metal alloys, or plastics. Each of these components may be formed using die casting and/or machining processes. According to one embodiment, each of the components is machined from a material comprising an aluminum 6061-T6 alloy. Those skilled in the art will recognize different types of materials suitable for these components in different applications within the scope of the invention. For example, extreme work environments and/or high torque motors may require stronger materials than would be suitable in less strenuous conditions.

As described above, the invention provides a rotary position encoder that utilizes a single-bearing configuration for mounting the encoder on a rotatable shaft. By preloading the single bearing and mounting the encoder directly to the rotatable shaft, the invention provides a solution that is less complex and more reliable than conventional encoders currently being used.

The foregoing description is provided to enable one skilled in the art to practice the various embodiments of the invention described herein. Various modifications to these embodiments will be readily apparent to those skilled in the art, and generic principles defined herein may be applied to other embodiments. Thus, the following claims are not intended to be limited to the embodiments of the invention shown and described herein, but are to be accorded the full scope consistent with the language of the claims. All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A rotary position encoder, comprising:
    a hub that directly mounts on an end of a rotatable shaft of a machine tool and that rotates concurrently with the rotatable shaft, wherein the hub comprises a cup formed in a first end to receive the rotatable shaft and a plurality of equally spaced axial grooves formed on an inner surface of the cup creating portions of the cup that are thinner than other portions of the cup;
    a collar configured to collapse the cup around the end of the rotatable shaft;
    a sensor configured to detect a rotational position of the hub;
    a housing, wherein the sensor is mounted to the housing in a position adjacent to the hub;
    one and only one bearing, wherein the hub is rotatably coupled to the housing via the one and only one bearing; and
    a bracket comprising a central portion attached to the housing and a plurality of flexible mounting tabs extending away from the central portion for mounting the rotary position encoder to the machine tool at a plurality of corresponding anchor points, wherein the central portion of the bracket defines an opening through which the hub extends away from the housing.

2. The rotary position encoder according to claim 1, wherein the collar comprises a pinch collar.

3. The rotary position encoder according to claim 1, wherein the collar comprises a clamping collar.

4. The rotary position encoder according to claim 1, wherein the rotary position encoder further comprises a magnet mounted on a second end of the hub opposite the sensor, wherein the sensor detects an angular position of the magnet.

5. The rotary position encoder according to claim 4, wherein the magnet is a diametrically polarized cylindrical magnet.

6. The rotary position encoder according to claim 1, the housing comprising:
 a body attached to the bracket, wherein the sensor is mounted to the body; and
 a cap attached to the body,
 wherein the body and the cap partially define a cavity containing the sensor.

7. The rotary position encoder according to claim 1, wherein the one and only one bearing comprises a rolling element bearing.

8. The rotary position encoder according to claim 1, wherein the one and only one bearing comprises a deep groove ball bearing.

9. The rotary position encoder according to claim 1, wherein the bracket comprises stainless steel having a thickness of 0.012 to 0.015 in.

10. The rotary position encoder according to claim 1, further comprising an interface for communicating rotational position information generated by the sensor to a controller.

11. A rotary position encoder, comprising:
 a hub having a cup formed in a first end to receive and directly mount on an end of a rotatable shaft of a machine tool and that rotates concurrently with the rotatable shaft;
 a sensor configured to detect a rotational position of the hub;
 a housing, wherein the sensor is mounted to the housing in a position adjacent to the hub;
 one and only one bearing, wherein the hub is rotatably coupled to the housing via the one and only one bearing; and
 a flexible bracket comprising a central portion attached to the housing and a plurality of mounting tabs extending away from the central portion for mounting the rotary position encoder to the machine tool at a plurality of corresponding anchor points, wherein the central portion of the flexible bracket defines an opening through which the hub extends away from the housing.

12. The rotary position encoder according to claim 11, wherein the rotary position encoder further comprises a diametrically polarized cylindrical magnet mounted on a second end of the hub opposite the sensor, wherein the sensor detects an angular position of the magnet.

13. The rotary position encoder according to claim 11, the housing comprising:
 a body attached to the bracket, wherein the sensor is mounted to the body; and
 a cap attached to the body,
 wherein the body and the cap partially define a cavity containing the sensor.

14. The rotary position encoder according to claim 11, wherein the one and only one bearing comprises a rolling element bearing or a deep groove ball bearing.

15. The rotary position encoder according to claim 11, wherein the bracket comprises stainless steel having a thickness of 0.012 to 0.015 in.

16. The rotary position encoder according to claim 11, further comprising an interface for communicating rotational position information generated by the sensor to a controller.

* * * * *